United States Patent
Lee et al.

(10) Patent No.: US 11,559,923 B2
(45) Date of Patent: Jan. 24, 2023

(54) METHOD FOR PREPARING POLYAMIDE-IMIDE FILM

(71) Applicant: SKC CO., LTD., Gyeonggi-do (KR)

(72) Inventors: Jin Woo Lee, Gyeonggi-do (KR); Dae Seong Oh, Seoul (KR); Dawoo Jeong, Gyeonggi-do (KR); Dong Jin Lim, Gyeonggi-do (KR); Cheol Ho Kim, Seoul (KR)

(73) Assignee: SKC CO., LTD., Gyeonggi-do (KR)

( * ) Notice: Subject to any disclaimer, the term of this patent is extended or adjusted under 35 U.S.C. 154(b) by 731 days.

(21) Appl. No.: 16/480,878

(22) PCT Filed: Feb. 6, 2018

(86) PCT No.: PCT/KR2018/001568
§ 371 (c)(1),
(2) Date: Jul. 25, 2019

(87) PCT Pub. No.: WO2018/147618
PCT Pub. Date: Aug. 16, 2018

(65) Prior Publication Data
US 2019/0358865 A1   Nov. 28, 2019

(30) Foreign Application Priority Data

Feb. 9, 2017  (KR) .......................... 10-2017-0018138

(51) Int. Cl.
| | | |
|---|---|---|
| C08G 73/14 | (2006.01) | |
| B29C 39/00 | (2006.01) | |
| B29C 39/42 | (2006.01) | |
| B29D 7/01 | (2006.01) | |
| C08K 5/136 | (2006.01) | |
| C08K 5/17 | (2006.01) | |
| C08L 79/08 | (2006.01) | |
| B29K 79/00 | (2006.01) | |

(52) U.S. Cl.
CPC ............ *B29C 39/006* (2013.01); *B29C 39/42* (2013.01); *B29D 7/01* (2013.01); *C08G 73/14* (2013.01); *C08K 5/136* (2013.01); *C08K 5/17* (2013.01); *C08L 79/08* (2013.01); *B29K 2079/085* (2013.01); *C08L 2201/10* (2013.01)

(58) Field of Classification Search
CPC ...... C08G 73/14; C08J 2379/08; C08L 79/08; C08L 2201/01
See application file for complete search history.

(56) References Cited

U.S. PATENT DOCUMENTS

| | | | |
|---|---|---|---|
| 2014/0243482 A1 | 8/2014 | Park et al. | |
| 2016/0194448 A1* | 7/2016 | Song | C08G 73/14 |
| | | | 428/473.5 |
| 2016/0222249 A1 | 8/2016 | Choi et al. | |
| 2018/0002486 A1* | 1/2018 | Kim | C08G 73/14 |
| 2018/0002487 A1* | 1/2018 | Yang | C08G 73/14 |

FOREIGN PATENT DOCUMENTS

| | | |
|---|---|---|
| KR | 10-2013-0091217 | 8/2013 |
| KR | 10-2013-0133476 | 12/2013 |
| KR | 10-1583845 | 1/2016 |
| KR | 10-2016-0081829 | 7/2016 |
| KR | 10-2016-0094086 | 8/2016 |

OTHER PUBLICATIONS

Office Action issued by the Taiwanese Intellectual Property Office dated Apr. 11, 2019.

* cited by examiner

*Primary Examiner* — Gregory Listvoyb
(74) *Attorney, Agent, or Firm* — IP & T Group LLP

(57) ABSTRACT

One embodiment relates to a method for preparing a polyamide-imide film which is colorless and transparent and has good mechanical properties, easily and efficiently in terms of yield. Particularly, the embodiment relates to a preparation method capable of obtaining a polyamide-imide film of which the optical characteristics, mechanical properties and flexibility are harmoniously improved without complicated processes, by controlling the amount of imide repeating units and amide repeating units constituting the polyamide-imide film.

7 Claims, No Drawings

METHOD FOR PREPARING POLYAMIDE-IMIDE FILM

This application is a national stage application of PCT/KR2018/001568 filed on Feb. 6, 2018, which claims priority of Korean patent application number 10-2017-0018138 filed on Feb. 9, 2017. The disclosure of each of the foregoing applications is incorporated herein by reference in its entirety.

TECHNICAL FIELD

Embodiments relate to a process for preparing a polyamide-imide film having improved optical and mechanical characteristics.

BACKGROUND ART

A polyimide resin is a high heat-resistant resin prepared by a solution polymerization of an aromatic dianhydride and an aromatic diamine or an aromatic diisocyanate to obtain a polyamic acid derivative and imidizing the polyamic acid derivative through ring closure thereof at a high temperature.

Examples of the aromatic dianhydride include pyromellitic dianhydride (PMDA) and biphenyltetracarboxylic dianhydride (BPDA), and examples of the aromatic diamines include oxydianiline (ODA), p-phenylenediamine (p-PDA), m-phenylenediamine (m-PDA), methylenedianiline (MDA), and bisaminophenylhexafluoropropane (HFDA).

The polyimide resin is excellent in resistance to thermal oxidation, heat resistance, radiation resistance, characteristics at low temperatures, chemical resistance, and the like. Therefore, it is widely used as a heat-resistant advanced material for automobiles, airplanes, spaceships, and the like, as well as an electronic material for insulation coatings, insulation films, semiconductors, protective films for electrodes in TFTs-LCDs, and the like.

In the conventional process, a polyimide film has been prepared by subjecting a polyamic acid solution containing a polymer produced from an aromatic dianhydride and an aromatic diamine to an imidization reaction in the presence of an imidization catalyst to obtain a polyimide solution (i.e., polyimidization reaction), adding the polyimide solution to a solvent to precipitate a solid component (i.e., precipitation), filtering and drying the solid component to obtain a polyimide resin solid component (i.e., filtration and drying), dissolving the polyimide resin solid component in a solvent to obtain a polyimide resin solution (i.e., redissolution), and forming the polyimide resin solution into a film.

DISCLOSURE OF INVENTION

Technical Problem

An embodiment aims to provide a process for preparing a polyamide-imide film having improved optical and mechanical characteristics.

Solution to Problem

According to an embodiment, there is provided a process for preparing a polyamide-imide film, which comprises sequentially or simultaneously polymerizing monomers comprising an aromatic diamine, an aromatic dianhydride, and an aromatic dicarbonyl compound in a solvent to produce a polyamide-imide polymer solution; casting the polyamide-imide polymer solution onto a casting body without separate steps of precipitation, drying, and redissolution to prepare a gel sheet; and removing the solvent contained in the gel sheet and thermally treating the gel sheet under an atmosphere containing 65% by volume to 85% by volume of nitrogen ($N_2$) and 15% by volume to 35% by volume of oxygen ($O_2$) to produce the polyamide-imide film, wherein the polyamide-imide film has a yellow index of 5 or less, a transmittance of 88% or more, a haze of 2% or less, and a modulus of 5.0 GPa or more.

Advantageous Effects of Invention

In the process for preparing a polyamide-imide film according to the embodiment, a polyamide-imide polymer is obtained and cast with a solvent to produce a gel sheet, and the gel sheet is thermally treated under a predetermined atmosphere to produce the polyamide-imide film.

The polyamide-imide polymer according to the embodiment has high oxidation resistance. Thus, even if a gel sheet produced therefrom is thermally treated under the predetermined atmosphere, the polyamide-imide film has a yellow index that has not been increased and a high transmittance.

In addition, upon completion of the polymerization reaction for producing the polyamide-imide polymer, a polymer solution containing the polymer produced by the polymerization reaction and the solvent used in the polymerization reaction is formed. Since byproducts are hardly formed during the process for producing the polymer, the polymer solution can be directly cast onto a casting body. That is, in the process for preparing a polyamide-imide film, the polymer solution can be cast without separate steps of drying and redissolution to produce a gel sheet.

Accordingly, according to the process of producing a polyamide-imide polymer as described above, it is possible to conveniently prepare a polyamide-imide film having improved optical characteristics in terms of a low yellow index, a high transmittance, and the like, as well as improved mechanical characteristics in terms of a high modulus and the like.

Since the process for preparing a polyamide-imide film according to the embodiment is capable of producing a polyamide-imide film having excellent optical characteristics without the further steps by way of properly adjusting the contents of a polyimide structure and a polyamide structure, it can remarkably reduce the production time.

In addition, since the process for preparing a polyamide-imide film does not involve such steps as precipitation, filtration, and the like, any loss in the yield can be prevented.

Furthermore, in the process for preparing a polyamide-imide film, a polyamide-imide film having an excellent yellow index can be produced without nitrogen gas purging during the thermal treatment. Thus, it is possible to prevent an increase in cost due to the installation and operation of an equipment and to prevent a safety problem such as a harm to the human body.

Therefore, the process for preparing a polyamide-imide film according to the embodiment can greatly contribute to the mass production of the film and the competitiveness in the product market.

The effects of the embodiment are not limited to those mentioned above. It is to be understood that the effects of the embodiment include all the effects reasonably inferred from the following description.

BEST MODE FOR CARRYING OUT THE INVENTION

Hereinafter, the present invention will be described in detail with reference to the embodiments. The embodiments may be modified into various forms as long as the gist of the invention is not altered. But the scope of the present invention is not limited to the embodiments described below.

In the following description, the constructions and functions well known in the art will be omitted if they would obscure the gist of the present invention. In this specification, when a part is referred to as "comprising" an element, it is to be understood that the part may comprise other elements as well, unless otherwise indicated.

Further, all numbers and expression related to the quantities of components, reaction conditions, and the like used herein are to be understood as being modified by the term "about," unless otherwise indicated.

In the process for preparing a polyamide-imide film according to an embodiment, a polyamide-imide polymer is first provided. The polyamide-imide polymer may be prepared by polymerizing monomers in a solvent.

That is, monomers comprising an aromatic diamine, an aromatic dianhydride, and an aromatic dicarbonyl compound are sequentially or simultaneously polymerized in a solvent to prepare a polyamide-imide polymer solution.

The polyamide-imide polymer solution is a solution comprising a polyamide-imide polymer.

In order to produce the polyamide-imide polymer, a polyamic acid may be first prepared.

In order to produce the polyamic acid, an aromatic diamine and an aromatic dianhydride are provided. The aromatic diamine and the aromatic dianhydride react in an organic solvent to produce a polyamic acid solution. Thereafter, a dicarbonyl compound is added to the polyamic acid to produce a polyamide-imide polymer solution. Here, the dicarbonyl compound may be an aromatic dicarbonyl compound.

In a different way, in order to produce the polyamide-imide polymer solution, the aromatic diamine, the aromatic dianhydride, and the dicarbonyl compound may be simultaneously polymerized.

The copolymer thus produced comprises an imide repeat unit derived from the bonding of the aromatic diamine compound and the aromatic dianhydride compound and amide repeat units derived from the bonding of the aromatic diamine compound and the dicarbonyl compound.

The aromatic diamine is a compound that forms an imide bond with the aromatic dianhydride and forms amide bonds with the dicarbonyl compound.

In an embodiment, the aromatic diamine may be 2,2'-bis(trifluoromethyl)-4,4'-diaminobiphenyl (TFDB) represented by the following Formula 1.

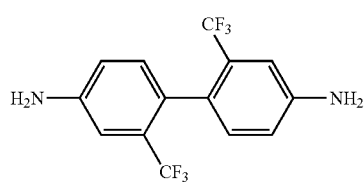

[Formula 1]

The aromatic dianhydride can contribute to improvements in the optical properties such as transmittance of the polyamide-imide film, since it has a low birefringence value.

In an embodiment, the aromatic dianhydride may be 2,2'-bis-(3,4-dicarboxyphenyl) hexafluoropropane dianhydride (6-FDA) represented by the following Formula 2.

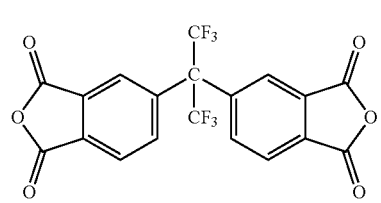

[Formula 2]

The aromatic diamine compound and the aromatic dianhydride compound may be polymerized to form a polyamic acid.

Subsequently, the polyamic acid may be converted to a polyimide through a dehydration reaction, and the polyimide comprises an imide repeat unit.

For example, the polyimide may comprise a compound represented by the following Formula 3, but it is not limited thereto.

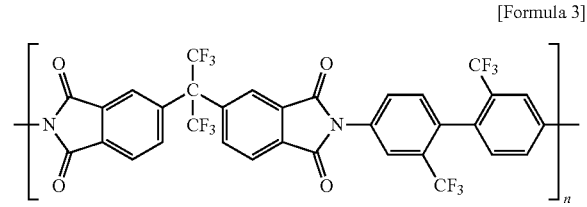

[Formula 3]

In the above Formula 3, n is an integer of 1 to 400.

An aromatic dicarbonyl compound is added to the polyamic acid to form a polyamide-imide polymer.

Since the aromatic dicarbonyl compound comprises a benzene ring, it can contribute to improvements in the mechanical properties such as surface hardness and tensile strength of the polyamide-imide film.

The aromatic dicarbonyl compound may be selected from the group consisting of terephthaloyl chloride (TPC) and 1,1'-biphenyl-4,4'-dicarbonyl dichloride (BPDC). In more detail, if terephthaloyl chloride (TPC) represented by the following Formula 4 and 1,1'-biphenyl-4,4'-dicarbonyl dichloride (BPDC) represented by the following Formula 5 are used in a proper combination, the polyamide-imide film may have high oxidation resistance.

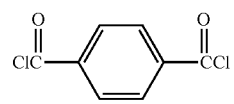

[Formula 4]

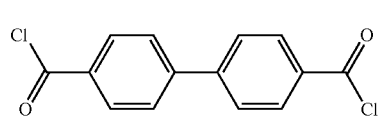

[Formula 5]

Therefore, the aromatic diamine and the aromatic dicarbonyl compound may be reacted and bonded to form amide repeat units represented by the following Formulae 6 and 7.

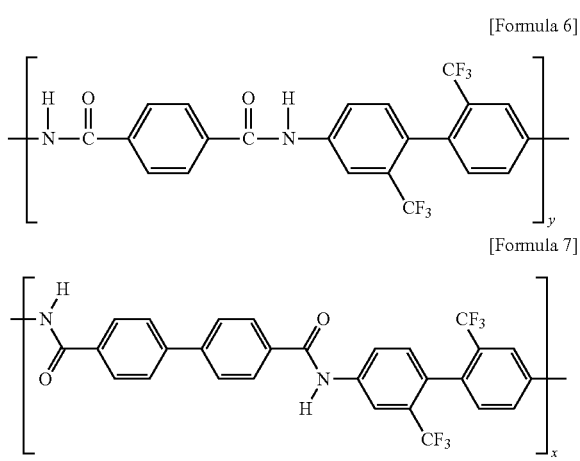

In the above Formula 6, y is an integer of 1 to 400.

In the above Formula 7, x is an integer of 1 to 400.

A catalyst may be further added in addition to the aromatic dicarbonyl compound. Examples of the catalyst include beta picoline, acetic anhydride, and the like.

The organic solvent employed in the polymerization reaction may be at least one selected from dimethylformamide (DMF), dimethylacetamide (DMAc), N-methyl-2-pyrrolidone (NMP), m-cresol, tetrahydrofuran (THF), and chloroform.

In an embodiment, it is possible to produce a polyamide-imide film whose optical characteristics, mechanical properties, and flexibility are improved in a well-balanced manner without a complicated process by properly controlling the content of the imide repeat unit and those of the amide repeat units.

The content of the imide repeat unit and those of the amide repeat units may be controlled by the amounts of the aromatic dianhydride and the aromatic dicarbonyl compound.

In the process for preparing a polyamide-imide film according to an embodiment, the aromatic dianhydride and the dicarbonyl compound are sequentially added to an excessive amount of the aromatic diamine in the step of producing the polyamide-imide polymer.

Specifically, the aromatic dianhydride in an amount of 20% by mole to 50% by mole and the aromatic dicarbonyl compound in an amount of 50% by mole to 80% by mole based on the total moles of the aromatic dianhydride and the aromatic dicarbonyl compound are employed to produce the polymer solution. The sequence of adding the aromatic dianhydride and the aromatic dicarbonyl compound is not particularly limited. However, it may be preferable to sufficiently stir the mixture containing the material added first before adding the material to be added later.

If the content of the aromatic dianhydride exceeds 50% by mole and the content of the aromatic dicarbonyl compound is less than 50% by mole, such mechanical properties as surface hardness, tensile strength, and the like of the polyamide-imide film may be deteriorated.

On the other hand, if the content of the aromatic dianhydride is less than 20% by mole and the content of the aromatic dicarbonyl compound exceeds 80% by mole, such optical properties as transmittance, haze, and the like of the polyamide-imide film may be deteriorated.

In addition, in the process for preparing a polyamide-imide film according to an embodiment, terephthaloyl chloride (TPC) and 1,1'-biphenyl-4,4'-dicarbonyldichloride (BPDC) may be used as the aromatic dicarbonyl compound in the step of producing the polyamide-imide polymer, wherein 1,1'-biphenyl-4,4'-dicarbonyldichloride (BPDC) is in an amount of 50% by mole to 70% by mole based on the total moles of these two compounds.

If the content of 1,1'-biphenyl-4,4'-dicarbonyldichloride (BPDC) is less than 50% by mole, the tensile strength (or modulus) of the polyamide-imide film may be deteriorated. If this content exceeds 70% by mole, such optical properties as haze and the like may be deteriorated.

Accordingly, it may be preferable to add (i) 50% by mole to 80%0 of the aromatic dicarbonyl compound based on the total moles of the aromatic dianhydride compound and the aromatic dicarbonyl compound to an excessive amount of the aromatic diamine compound (or in the same molar amount as that of the other reactants), wherein (ii) 1,1'-biphenyl-4,4'-dicarbonyldichloride (BPDC) and terephthaloyl chloride (TPC) are used as the aromatic dicarbonyl compound in amounts of 50% by mole to 70% by mole and 30% by mole to 50% by mole, respectively.

In a different way, the aromatic diamine, the aromatic dianhydride, and the dicarbonyl compound are simultaneously added to produce the polyamide-imide polymer.

The viscosity of the polyamide-imide polymer solution can be controlled by the following way.

When the aromatic dicarbonyl compound is added to the polyamic acid solution for the reaction, the aromatic dicarbonyl compound is added until the viscosity of the reaction system is increased to a desired viscosity.

Accordingly, the viscosity of the polyamide-imide polymer solution may be about 150,000 cps to about 500,000 cps, specifically about 150,000 cps to about 300,000 cps, or about 150,000 cps to about 200,000 cps. In such event, the content of solids in the polyamide-imide polymer solution may be about 5% by weight to about 20% by weight or about 10% by weight to about 20% by weight. In more detail, the content of solids in the polyamide-imide polymer solution may be about 12% by weight to about 18% by weight.

If the viscosity and the content of solids in the polyamide-imide polymer solution are within the above ranges, a polyamide-imide film can be effectively produced in the extrusion and casting steps as described below.

In addition, if the viscosity and the content of solids in the polyamide-imide polymer solution are within the above ranges, the polyamide-imide film thus produced may have mechanical properties such as an improved high modulus and the like and optical properties such as a low yellow index.

Thereafter, the pH of the polyamide-imide polymer solution may be adjusted by the following way.

A neutralizing agent may be added to the polyamide-imide polymer solution. Examples of the neutralizing agent include amine-based neutralizing agents such as alkoxyamine, alkylamine, alkanolamine, and the like.

The neutralizing agent may be employed in an amount of about 0.1% by mole to about 10% by mole based on the entire monomers in the polyamide-imide polymer solution.

The pH of the polyamide-imide polymer solution may be about 4 to about 7. In more detail, the pH of the polyamide-imide polymer solution may be about 4.5 to about 7. If the pH of the polyamide-imide polymer solution is within the above-described range, it is possible to prevent corrosion of the equipment in the extrusion and casting steps as described below.

In addition, if the pH of the polyamide-imide polymer solution is within the above-described range, the polyamide-imide film thus produced according to the embodiment may have improved optical properties in terms of a low yellow index, a low increase in the yellow index, and the like. Further, if the pH of the polyamide-imide polymer solution is within the above-described range, the polyamide-imide film thus produced according to the embodiment may have improved mechanical properties in terms of a high modulus and the like.

In addition, in the above preparation process, the polymer solution as it is, which contains the solvent used in the production of the polyamide-imide polymer, is used in the extrusion and casting steps.

That is, the preparation process as described above does not involve such separate steps of precipitation, drying, and redissolution, except for such minor treatment as pH adjustment and viscosity adjustment as described above.

In the conventional process, in order to remove byproducts formed during the production of a polyamide-imide polymer solution, the polymer solution thus produced is subjected to separate steps of precipitation, drying, and then redissolution in a solvent to thereby obtain a composition for forming a film. However, there has been a problem that the process efficiency has been significantly lowered with a decrease in the yield through the steps of precipitation, drying, and redissolution.

Accordingly, in the above preparation process according to the embodiment, the formation of byproducts is minimized in the course of the production of a polymer solution, which can be directly used in the step of film formation without separate steps of precipitation, drying, and redissolution. As a result, it is possible to significantly improve the process efficiency and to achieve a favorable effect in terms of the yield in the above-described production process.

The polyamide-imide polymer solution is extruded and cast onto a casting body such as a casting roll, a casting belt, and the like.

In such event, the polyamide-imide polymer solution having a viscosity and a content of solids within the above-mentioned ranges is cast at a rate of about 0.5 m/min to about 15 m/min and in a thickness of 400 to 500 μm onto the casting body.

If the extrusion and casting rates are within the above ranges, the polyamide-imide film thus produced by the above preparation process can have improved optical and mechanical characteristics. That is, when the polyamide-imide polymer solution has a viscosity and a content of solids within the above-mentioned ranges, the extrusion and casting at the extrusion rate as described above can impart improved optical and mechanical characteristics.

In addition, the polyamide-imide film prepared at the above casting rate may have an orientation angle of about ±30° to about ±50° with respect to the machine direction (or MD). If the polyamide-imide film has an orientation angle within the above range, it may have improved optical and mechanical characteristics. The orientation angle of the polyamide-imide film refers to the angle at which the polyamide-imide resin inside the film is oriented with respect to the direction (i.e., MD) in which the polyamide-imide film is cast.

For example, the polyamide-imide film prepared at the above casting rate may have a yellow index of about 5 or less, a transmittance of about 88% or more, and a modulus of about 5.0 GPa or more.

After the polyamide-imide polymer solution is cast onto the casting body, the solvent contained in the polyamide-imide polymer solution is removed by a drying step to thereby form a gel sheet on the casting body.

The drying step may be carried out at a temperature of about 80° C. to about 150° C. for a period of time ranging from about 5 minutes to about 15 minutes.

Thereafter, the gel sheet is thermally treated under an atmosphere containing 65% by volume to 85% by volume of nitrogen ($N_2$) and 15% by volume to 35% by volume of oxygen ($O_2$) to thereby produce the polyamide-imide film.

The thermal treatment may be carried out in a temperature range of about 150° C. to about 470° C. for about 10 minutes to about 20 minutes. In more detail, the thermal treatment may be carried out for about 5 minutes to about 15 minutes in an inline thermal treatment apparatus having in an inlet temperature of about 80° C. to about 150° C. and a temperature elevation rate of 10° C./min to 25° C./min.

Since the polyimide-imide polymer prepared according to the process as described above has high oxidation resistance, it is hardly affected by oxygen during the thermal treatment step. Accordingly, it is possible to carry out the thermal treatment without nitrogen gas purging that has been adopted in the conventional process. Accordingly, the present process is advantageous in that the process efficiency is improved, as well as a polyamide-imide film having improved optical characteristics can be produced even if the thermal treatment is carried out in an environment similar to the normal atmosphere.

According to an embodiment, it is possible to provide a polyamide-imide film whose optical characteristics, mechanical properties, and flexibility are improved in a well-balanced manner without such steps as polyimidization reaction, precipitation, filtration, drying, and redissolution as adopted in the prior art by properly controlling the content of the imide repeat unit and those of the amide repeat units in the step of obtaining the polymer solution.

In addition, nitrogen gas purging is carried out during the thermal treatment in the course of forming a polyimide film in the conventional process in order to prevent yellowing of the film and to secure transparency of the film. According to an embodiment of the present invention, however, a polyamide-imide film having excellent optical characteristics can be produced without such nitrogen gas purging.

The polyamide-imide film prepared according to the embodiment as described above may have a surface hardness of about HB or higher based on a thickness of 20 μm to 70 μm or based on a thickness of 25 μm to 60 μm in more detail. In more detail, the surface hardness of the polyamide-imide film according to the embodiment may be about H or higher based on the thickness as described above.

In addition, the polyamide-imide film prepared according to the embodiment as described above may have a transmittance measured at 550 nm of 88% or more, a haze of 2% or less, and a yellow index of 5 or less.

In more detail, the polyamide-imide film according to one embodiment may have a transmittance of 89% or more, a haze of 1% or less, and a yellow index of 4 or less based on the above criteria.

In more detail, the polyamide-imide film according to one embodiment may have a transmittance of 89% or more, a haze of less than 1%, and a yellow index of 4 or less based on the above criteria.

In more detail, the polyamide-imide film according to one embodiment may have a transmittance of 89% or more, a haze of 0.5% or less, and a yellow index of 3 or less.

In addition, the polyamide-imide film according to an embodiment may have a modulus of 5 GPa or more. In more detail, the modulus of the polyamide-imide film according to the embodiment may be 5.2 GPa or more. In more detail, the modulus of the polyamide-imide film according to the embodiment may be 5.3 GPa or more. The maximum value of the modulus of the polyamide-imide film according to the embodiment may be 10 GPa.

Since the polyamide-imide film prepared according to the embodiment is colorless, transparent, and excellent in mechanical properties and flexibility, it can be advantageously used in the flexible display field.

MODE FOR THE INVENTION

Hereinafter, the present invention will be described in detail by referring to Examples. But the following Examples are intended to further illustrate the present invention, and the scope of the present invention is not limited thereto.

Example 1

A 1 L glass reactor equipped with a temperature-controllable double jacket was charged with 710.8 g of dimethyl acetamide (DMAc) as an organic solvent at 20° C. under a nitrogen atmosphere. Then, 64 g (0.2 mole) of 2,2'-bis(trifluoromethyl)-4,4'-diaminobiphenyl (TFDB) as an aromatic diamine was slowly added thereto for dissolution thereof.

Subsequently, while 26.6 g (0.06 mole) of 2,2'-bis(3,4-dicarboxyphenyl) hexafluoropropane dianhydride (6-FDA) as an aromatic dianhydride was slowly added thereto, the mixture was stirred for 1 hour.

Then, 23.4 g (0.084 mole) of 1,1'-biphenyl-4,4'-dicarbonyldichloride (BPDC) as an aromatic dicarbonyl compound was added, followed by stirring for 1 hour. And 11.4 g (0.056 mole) of terephthaloyl chloride (TPC) was added, followed by stirring for 1 hour, thereby preparing a polymer solution.

The polymer solution was directly coated onto a glass plate and then dried with hot air at 80° C. for 30 minutes. The dried polyamide-imide polymer was peeled off from the glass plate, fixed to a pin frame, and thermally treated under an atmosphere containing 78% by volume of nitrogen ($N_2$) and 21% by volume of oxygen ($O_2$). Specifically, the thermal treatment was carried out in a temperature range of 80° C. to 300° C. at a temperature elevation rate of 2° C./min. As a result, a polyamide-imide film having a thickness of 30 µm was obtained.

Examples 2 to 4 and Comparative Examples 1 to 5

Each polyamide-imide film was produced in the same manner as Example 1, except that the content of each component was as shown in Table 1 below.

Comparative Example 6

A polymer solution was prepared with the content of each component as shown in Table 1 below. the polymer solution was directly coated onto a glass plate and then dried with hot air at 80° C. for 30 minutes.

The dried polyamide-imide polymer was peeled off from the glass plate, fixed to a pin frame, and thermally treated under a nitrogen purging condition, i.e., an atmosphere containing 99% by volume or more of nitrogen ($N_2$) and 1% by volume or less of oxygen ($O_2$). Specifically, the thermal treatment was carried out in a temperature range of 80° C. to 300° C. at a temperature elevation rate of 2° C./min. As a result, a polyamide-imide film having a thickness of 30 µm was obtained.

Comparative Example 7

A polymer solution was prepared with the content of each component as shown in Table 1 below. The polymer solution was precipitated in a mixture of 50 L of water and 20 L of ethanol to remove byproducts. The precipitated solid component was pulverized by filtration and then dried at 100° C. to 150° C. under vacuum for about 12 hours to obtain a powdered polyamide-imide resin. Subsequently, about 20 g of the polyamide-imide resin powder was dissolved in 200 g of DMAc, which was coated onto a glass plate and then dried with hot air at 80° C. for 30 minutes. It was then thermally treated in a temperature range of 25° C. to 300° C. at a temperature elevation rate of 3° C./min, thereby obtaining a polyamide-imide film having a thickness of 30.

TABLE 1

| | Charged amount (mole) | | | | | Thickness |
|---|---|---|---|---|---|---|
| | BPDA | 6-FDA | TPC | BPDC | TFDB | (µm) |
| Ex. 1 | — | 0.06 | 0.056 | 0.084 | 0.2 | 30 |
| Ex. 2 | — | 0.06 | 0.042 | 0.098 | 0.2 | 30 |
| Ex. 3 | — | 0.08 | 0.048 | 0.072 | 0.2 | 30 |
| Ex. 4 | — | 0.1 | 0.04 | 0.06 | 0.2 | 30 |
| C. Ex. 1 | — | 0.14 | 0.024 | 0.036 | 0.2 | 30 |
| C. Ex. 2 | — | 0.02 | 0.072 | 0.108 | 0.2 | 30 |
| C. Ex. 3 | — | 0.06 | 0.14 | — | 0.2 | 30 |
| C. Ex. 4 | — | 0.06 | 0.028 | 0.112 | 0.2 | 30 |
| C. Ex. 5 | — | 0.06 | — | 0.14 | 0.2 | 30 |
| C. Ex. 6 | — | 0.06 | 0.056 | 0.084 | 0.2 | 30 |
| C. Ex. 7 | 0.06 | 0.048 | 0.092 | — | 0.2 | 30 |

The amounts of the respective materials in Table 1 are shown in percent in mole in Table 2 below.

TABLE 2

| | Aromatic dianhydride (% by mole) | Aromatic dicarbonyl compound (% by mole) | BPDC in aromatic dicarbonyl compound (% by mole) |
|---|---|---|---|
| Ex. 1 | 30 | 70 | 60 |
| Ex. 2 | 30 | 70 | 70 |
| Ex. 3 | 40 | 60 | 60 |
| Ex. 4 | 50 | 50 | 60 |
| C. Ex. 1 | 70 | 30 | 60 |
| C. Ex. 2 | 10 | 90 | 60 |
| C. Ex. 3 | 30 | 70 | 0 |
| C. Ex. 4 | 30 | 70 | 80 |
| C. Ex. 5 | 30 | 70 | 100 |
| C. Ex. 6 | 30 | 70 | 60 |
| C. Ex. 7 | 54 | 46 | 0 |

Test Example

The polyamide-imide films according to the Examples and the Comparative Examples were measured and evaluated for the following properties. The results are shown in Table 3 below.

(1) Measurement of Surface Hardness

The surface hardness was measured with a pencil hardness measuring instrument (CT-PC 1, CORE TECH, Korea) with a pencil hardness measuring pencil mounted at an angle of 45° and at a pencil speed of 300 mm/min while a constant load (750 g) was applied. The pencil used was Mitsubishi pencils having a strength of H to 9H, F, HB, B to 6B, and the like.

(2) Transmittance and Haze (HZ)

The light transmittance at 550 nm and the haze were measured using a haze meter NDH-5000W manufactured by Nippon Denshoku Kogyo.

(3) Yellow Index (YI)

The yellow Index (YI) was measured with a spectrophotometer (UltraScan PRO, Hunter Associates Laboratory) using a CIE colorimetric system.

(4) Modulus

A sample was cut out by at least 5 cm in the direction perpendicular to the main shrinkage direction of the film and by 10 cm in the main shrinkage direction. It was fixed by the clips disposed at intervals of 5 cm in a universal testing machine UTM 5566A of Instron. A stress-strain curve was obtained until the sample was fractured while it was stretched at a rate of 5 mm/min at room temperature. The slope of the load with respect to the initial strain in the stress-strain curve was taken as a modulus (GPa).

TABLE 3

|  | Surface hardness | Transmittance (%) | Haze (%) | Yellow index | Tensile strength (GPa) |
|---|---|---|---|---|---|
| Ex. 1 | H | 89.9 | 0.4 | 2.1 | 5.5 |
| Ex. 2 | 2H | 89.7 | 0.6 | 2.3 | 6.0 |
| Ex. 3 | H | 90.1 | 0.3 | 1.9 | 5.3 |
| Ex. 4 | HB | 90.2 | 0.3 | 1.8 | 5.2 |
| C. Ex. 1 | 6B | 90.8 | 0.2 | 1.3 | 3.7 |
| C. Ex. 2 | H | 87.7 | 15.2 | 4.6 | 6.5 |
| C. Ex. 3 | HB | 89.9 | 0.4 | 2.1 | 3.9 |
| C. Ex. 4 | H | 88.0 | 3.9 | 2.7 | 6.0 |
| C. Ex. 5 | H | 88.8 | 5.6 | 3.7 | 5.7 |
| C. Ex. 6 | HB | 88.7 | 0.6 | 1.9 | 4.3 |
| C. Ex. 7 | HB | 88.48 | 0.7 | 2.6 | — |

Referring to Table 3, the films of Examples 1 to 4 according to an embodiment satisfy all the conditions of a surface hardness of HB or higher, a transmittance of 89% or more, a haze of 1% or less, a yellow index of 3 or less, and a tensile strength of 5 GPa or more.

In contrast, in Comparative Example 1, the contents of terephthaloyl chloride (TPC) and 1,1'-biphenyl-4,4'-dicarbonyldichloride (BPDC) as the aromatic dicarbonyl compound were too low, which resulted in an insufficient tensile strength. In Comparative Example 2, the content of 2,2'-bis-(3,4-dicarboxyphenyl) hexafluoropropane dianhydride (6-FDA) as the aromatic dianhydride was too low, which resulted in deteriorated optical properties in terms of transmittance, haze, and yellow index.

Further, in Comparative Example 3, 1,1'-biphenyl-4,4'-dicarbonyldichloride (BPDC) as the aromatic dicarbonyl compound was not employed, which resulted in a very low tensile strength despite a satisfactory surface hardness. In Comparative Examples 4 and 5, the content of 1,1'-biphenyl-4,4'-dicarbonyldibromide (BPDC) in the aromatic dicarbonyl compound was too high, so that the optical properties in terms of yellow index and haze were deteriorated.

In addition, in Comparative Example 6, the thermal treatment was carried out under a nitrogen purging condition with a nitrogen content of almost 100%. It was confirmed that the films of Examples 1 to 4, in which such nitrogen purging was not performed, had excellent physical properties equal to, or better than, those of the film of Comparative Example 6.

Further, in Comparative Example 7, a film was prepared through separate steps of precipitation, drying, and redissolution. However, the film thereof was inferior to those of Examples 1 to 4 in terms of transmittance, haze, surface hardness, and tensile strength.

(5) Yield

For Examples 1 to 4 and Comparative Example 7, the yields were measured immediately before coating each of the polymer solutions on the glass plate, i.e., just before the film formation step. Specifically, the ratio of the number of moles of the materials remaining in the solution for coating to the number of moles of the charged materials was measured in percent by mole. The results are shown in Table 4 below.

TABLE 4

|  | Yield |
|---|---|
| Ex. 1 | 95.8% |
| Ex. 2 | 95.6% |
| Ex. 3 | 94.9% |
| Ex. 4 | 95.2% |
| C. Ex. 7 | 59.2% |

Referring to Table 4 above, according to the conventional production process as in Comparative Example 7 in which separate steps of precipitation, removal, and redissolution for removing byproducts are performed, the yield immediately before the film formation step is about 60%, which attributes to the loss of the materials that inevitably takes place in the steps of reaction, precipitation, filtration, drying, and the like. In contrast, in the preparation process of Examples 1 to 4 according to the embodiment, the polymer solution was directly applied to produce a film without separate steps of precipitation, drying, and redissolution. Here, the yields were 80 to 100%, 90 to 100%, or 94 to 100%. That is, the yields were close to 100%.

While the present invention is described in detail with reference to the Examples and the Test Examples, the scope of the present invention is not limited to the Examples and the Test Examples as described above. Various modifications and improvements that can be made by a person of ordinary skill in the art based on the gist of the present invention as defined in the following claims will also fall within the scope of the present invention.

The invention claimed is:

1. A process for preparing a polyamide-imide film, which comprises:

sequentially or simultaneously polymerizing monomers comprising an aromatic diamine, an aromatic dianhydride, and an aromatic dicarbonyl compound in a solvent to produce a polyamide-imide polymer solution;

casting the polyamide-imide polymer solution onto a casting body without separate steps of precipitation, drying, and redissolution to prepare a gel sheet;

removing the solvent contained in the gel sheet and thermally treating the gel sheet under an atmosphere containing 65% by volume to 85% by volume of nitrogen ($N_2$) and 15% by volume to 35% by volume of oxygen ($O_2$) to produce the polyamide-imide film, and increasing the viscosity of the polyamide-imide polymer solution to 150,000 cps to 500,000 cps by adding more of the dicarbonyl compound, wherein the polyamide-imide film has a yellow index of 5 or less, a transmittance of 88% or more, a haze of 2% or less, and a modulus of 5.0 GPa or more, and wherein the aromatic dicarbonyl compound is terephthaloyl chloride (TPC) and 1,1'-biphenyl-4,4'-dicarbonyldichloride (BPDC), and the aromatic dicarbonyl compound comprises 1,1'-biphenyl-4,4'-dicarbonyldichloride (BPDC) in an amount of 50% by mole to 70% by mole based on the total moles of terephthaloyl chloride (TPC) and 1,1'-biphenyl-4,4'-dicarbonyldichloride (BPDC).

2. The process for preparing a polyamide-imide film of claim 1, wherein in the step of the thermal treatment, the gel sheet is thermally treated in a temperature range of 150° C. to 470° C. for 10 minutes to 20 minutes.

3. The process for preparing a polyamide-imide film of claim 2, wherein the aromatic diamine comprises 2,2'-bis(trifluoromethyl)-4,4'-diaminobiphenyl (TFDB), and the aromatic dianhydride comprises 2,2'-bis(3,4-dicarboxyphenyl) hexafluoropropane dianhydride (6-FDA).

4. The process for preparing a polyamide-imide film of claim 1, wherein the solvent is selected from the group consisting of dimethylformamide (DMF), dimethylacetamide (DMAc), N-methyl-2-pyrrolidone (NMP), m-cresol, tetrahydrofuran (THF), and chloroform.

5. The process for preparing a polyamide-imide film of claim 1, wherein the monomers comprise the aromatic dianhydride in an amount of 20% by mole to 50% by mole and the aromatic dicarbonyl compound in an amount of 50% by mole to 80% by mole based on the total moles of the aromatic dianhydride and the aromatic dicarbonyl compound.

6. The process for preparing a polyamide-imide film of claim 1, wherein the polyamide-imide film has a surface hardness of HB or higher based on a thickness of 20 μm to 70 μm.

7. The process for preparing a polyamide-imide film of claim 1, wherein the polyamide-imide film has a transmittance of 89% or more and a haze of 2% or less based on a thickness of 20 μm to 70 μm.

* * * * *